(12) United States Patent
Dantkale et al.

(10) Patent No.: US 9,727,273 B1
(45) Date of Patent: Aug. 8, 2017

(54) SCALABLE CLUSTERWIDE DE-DUPLICATION

(71) Applicant: Veritas US IP Holdings LLC, Mountain View, CA (US)

(72) Inventors: Suhas Dantkale, Sunnyvale, CA (US); Niranjan Pendharkar, Pune (IN); Chaitanya Yalamanchili, Santa Clara, CA (US)

(73) Assignee: Veritas Technologies LLC, Mountain View, CA (US)

( * ) Notice: Subject to any disclaimer, the term of this patent is extended or adjusted under 35 U.S.C. 154(b) by 0 days.

(21) Appl. No.: 15/047,479

(22) Filed: Feb. 18, 2016

(51) Int. Cl.
*G06F 12/16* (2006.01)
*G06F 3/06* (2006.01)

(52) U.S. Cl.
CPC .......... *G06F 3/0641* (2013.01); *G06F 3/0619* (2013.01); *G06F 3/0667* (2013.01); *G06F 3/0683* (2013.01)

(58) Field of Classification Search
None
See application file for complete search history.

(56) References Cited

U.S. PATENT DOCUMENTS

| | | | | |
|---|---|---|---|---|
| 9,235,535 B1* | 1/2016 | Shim | ...................... | G06F 12/16 |
| 2015/0347046 A1* | 12/2015 | Wang | ................ | G06F 17/30283 |
| | | | | 711/162 |
| 2016/0048408 A1* | 2/2016 | Madhu | ................ | G06F 11/1458 |
| | | | | 718/1 |
| 2017/0032013 A1* | 2/2017 | Zheng | ............... | G06F 17/30581 |
| 2017/0060696 A1* | 3/2017 | Wellnitz | ............. | G06F 11/1453 |

* cited by examiner

*Primary Examiner* — John A Lane
(74) *Attorney, Agent, or Firm* — Womble Carlyle Sandridge & Rice LLP (57) ABSTRACT

A system and method for minimizing duplicate data transfer in a clustered storage system, having compute nodes in a compute plane coupled to data nodes in a data plane is provided. The method may include generating a hash key relating to content of a virtual disk associated with a compute node. During a data replication phase, the method may detect duplicate data stored in respective storage units of the compute node and the data node using the hash key. Further, the method may eliminate redundant data transfers through the use of an index and mapping scheme, where only non-duplicate data is transferred along with a set of logical block addresses associated with duplicate data from the replicating compute node to the data node. During a data recovery phase, the method may transfer duplicate data from a peer compute node or from a virtual machine to the requesting compute node, eliminating excess data transfer.

20 Claims, 7 Drawing Sheets

SCALABLE CLUSTERWIDE DE-DUPLICATION

BACKGROUND

Cloud computing environments enable ubiquitous, convenient, on-demand network access to a shared pool of configurable computing resources (including, networks, servers, storage, applications, services, and the like); while virtualization of the same provides virtual (rather than actual) versions of computer hardware platforms, operating systems, storage devices, and computer network resources accessible to multiple computing devices. To achieve the feature of a shared pool of resources, the cloud computing environment may possess a primary (compute) plane and a secondary (data) plane, where the data plane off-loads storage and processing from the compute plane, releasing associated storage space and thereby enhancing the bandwidth of the compute plane. However, for both the virtual and cloud environments, the same operating system may be booted multiple times or multiple tenants may run similar types of applications. To further complicate matters, most modern big data applications include built-in fault tolerance policies, where data is duplicated across multiple compute nodes of the compute plane within the cloud computing environment. Examples may include massive database utilities such as Mongo® dB (a next-generation, cross-platform document-oriented database) and Apache Hadoop® (an open-source software framework for distributed storage and distributed processing of very large data sets on computer clusters built from commodity hardware). Accordingly, these applications may not only operate on a direct attached storage unit coupled to the compute node, but also make multiple copies of data across several compute nodes for redundancy. Further, each application may still need more than one version or snapshot at the consistency group level stored in the data plane.

One exemplary cloud computing system, having multiple compute nodes for every data node of the data plane, may have multiple instances of an application running on a number of compute nodes. Intermittently and independently, each compute node may replicate its data by sending the data to the data node as a form of continuous backup. Disk images (especially boot disk images), however, tend to possess a large amount of duplicate data content. This duplicate data content not only increases the network traffic, but also consumes a lot of storage space at the data node. Furthermore, multiple backup copies of duplicate data content require unnecessary data transfer to restore an instance of an application. For example, during data recovery associated with a compute node or an initial boot of a virtual machine in the compute plane, a large amount of duplicate data gets recovered, causing network congestion. As a result, the same data gets retrieved multiple times from the data plane to the compute plane in various scenarios including: application recovery from a data node; Extract, Transform, Load (ETL) database functions (which transfer data from one database and to another database); various data provisioning scenarios, and the like. Ultimately, duplicate data transfer results in excessive network bandwidth for the cloud environment including virtualization.

It is within this context that the embodiments arise.

SUMMARY

In some embodiments, a system and method for minimizing duplicate data transfer in a clustered storage system is provided. The method may include generating a hash key relating to content of a virtual disk associated with a compute node. The method may also include verifying, during a data replication phase, whether a data node is ready to receive data from a replicating compute node having a primary storage coupled thereto. In addition, the may comprise detecting, in response to the readiness of the data node, duplicate data stored in the primary storage and a secondary storage coupled to a data node. Further the method may include transferring, in response to the detected duplicate data, the detected non-duplicate data and a set of logical block addresses associated with the detected duplicate data from the replicating compute node to the data node. In another embodiment, the method may include transferring, during a data recovery phase, detected duplicate data from a peer compute node or a virtual machine within the requesting compute node; while detected non-duplicate data may be transferred from the data node to the requesting compute node.

In some embodiments, an optimization utility for a clustered storage system is provided. The system may include a memory coupled to a processor, wherein the processor is operable to generate a hash key relating to content of a virtual disk associated with a compute node. Further, the processor may be operable to verify, during a data replication phase, whether a data node is ready to receive data from a replicating compute node having a primary storage coupled thereto. In addition the processor may be operable to detect, in response to the readiness of the data node, duplicate data stored in the primary storage and a secondary storage coupled to a data node. Moreover, the processor may be operable to transfer, in response to the detected duplicate data, the detected non-duplicate data and a set of logical block addresses associated with the detected duplicate data from the replicating compute node to the data node. In another embodiment, the processor may be operable to transfer, during a data recovery phase, detected duplicate data from a peer compute node or a virtual machine within the requesting compute node; while detected non-duplicate data is transferred from the data node to the requesting compute node.

In some embodiments, a tangible, non-transitory, computer-readable media having instructions whereupon which, when executed by a processor, cause the processor to perform the router hijacking detection method described herein. The method may include generating a hash key relating to content of a virtual disk associated with a compute node. The method may also include verifying, during a data replication phase, whether a data node is ready to receive data from a replicating compute node having a primary storage coupled thereto. In addition, the may comprise detecting, in response to the readiness of the data node, duplicate data stored in the primary storage and a secondary storage coupled to a data node. Further the method may include transferring, in response to the detected duplicate data, the detected non-duplicate data and a set of logical block addresses associated with the detected duplicate data from the replicating compute node to the data node. In another embodiment, the method may include transferring, during a data recovery phase, detected duplicate data from a peer compute node or a virtual machine within the requesting compute node; while detected non-duplicate data may be transferred from the data node to the requesting compute node.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one so skilled in the art without departing from the spirit and scope of the described embodiments.

DETAILED DESCRIPTION

The embodiments below describe a system and method for minimizing duplicate data transfer in a clustered storage system. The method may include generating a hash key relating to content of a virtual disk associated with a compute node. The method may also include verifying, during a data replication phase, whether a data node is ready to receive data from a replicating compute node having a primary storage coupled thereto. In addition, the may comprise detecting, in response to the readiness of the data node, duplicate data stored in the primary storage and a secondary storage coupled to a data node. Further the method may include transferring, in response to the detected duplicate data, the detected non-duplicate data and a set of logical block addresses associated with the detected duplicate data from the replicating compute node to the data node. In another embodiment, the method may include transferring, during a data recovery phase, detected duplicate data from a peer compute node or a virtual machine within the requesting compute node; while detected non-duplicate data may be transferred from the data node to the requesting compute node The embodiments for the system and method of data recovery disclosed herein provide a method to solve the problem of network bandwidth optimization and storage optimization on secondary or Disaster Recovery (DR) sites. The method described herein can cooperate with pre-existing data storage protocols and does not require extra messaging. As a further advantage, the method disclosed herein including data transfer optimization may be employed without the use of an East-West network protocol. Moreover, the data recovery system and method can enable efficient recovery of virtual disk and boot disks.

The novel system and method disclosed herein may also use various deduplication algorithms for data transfer optimization. Additionally, the use of application group awareness may be applied to this data transfer optimization. Advantages of the system and method for data transfer optimization include no global index requirements (therefore, no costly lookups); and the ability to span across all compute nodes, such that level deduplication may be applied. During data recovery, the compute node or plane does not need to calculate fingerprints of the data associated with each virtual disk. Further, golden images may be recovered without any data flow, when the image is already present at the compute node.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "providing," "generating," "installing," "monitoring," "enforcing," "receiving," "logging," "intercepting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

Figure 1:
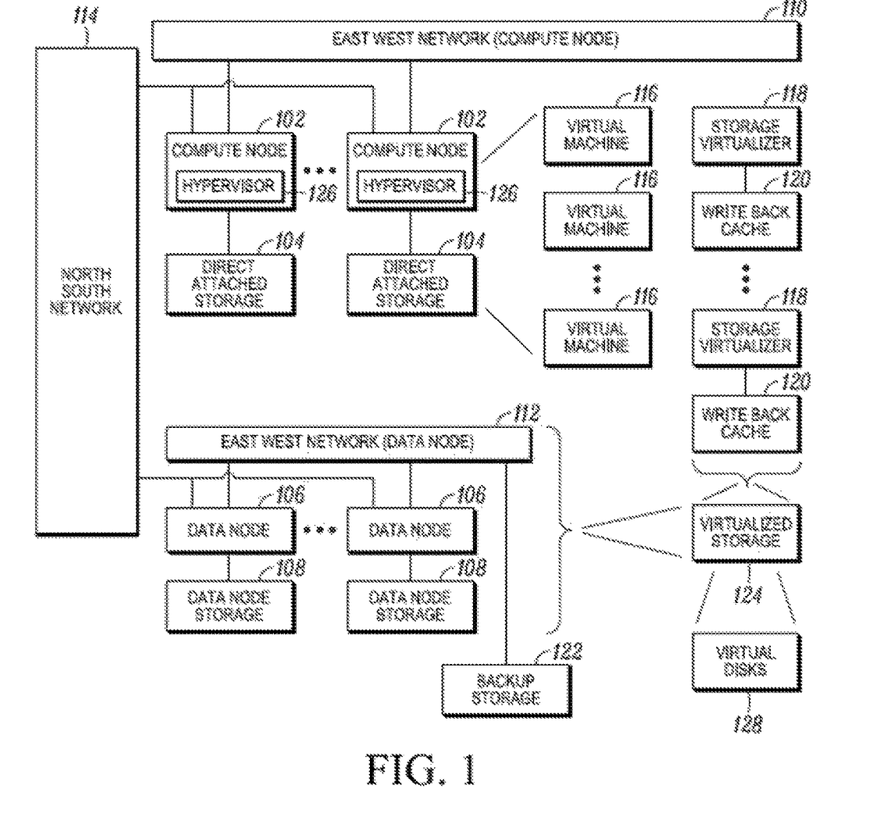
FIG. 1 is a block diagram of a computing and storage system that hosts virtual machines and one or more storage virtualizers, and performs data transfer optimization in accordance with an embodiment of the present disclosure.

FIG. 1 is a block diagram of a computing and storage system that hosts virtual machines and one or more storage virtualizers, and performs data transfer optimization in accordance with an example of an embodiment of the present disclosure. Various embodiments of the computing and storage system provide a storage cluster with a compute plane, a data management plane and a control plane, supporting virtual machines in a distributed manner. This system is fully scalable, such that data nodes and compute nodes can be added; applications can be added and managed; data can be migrated in and out; and virtual machines can be migrated in and out.

In one embodiment, FIG. 1 is a block diagram of a computing and storage system that hosts virtual machines 116 and one or more storage virtualizers 118, and performs data transfer optimization in accordance with an embodiment of the present disclosure. Compute nodes 102, with direct attached storage (DAS) 104, are coupled together by a network 110, in this example called the East-West network 110 for compute nodes. These interconnected compute nodes 102 are called a compute plane, or compute planes (depending upon how the virtual machines 116 are organized). The direct attached storage 104 of each compute node 102 is coupled to physical computing resources of that compute node (e.g., one or more processors), but is not coupled to other direct attached storages 104 of other compute nodes 102, or to other compute nodes 102 or resources outside of the compute nodes 102 except through the computing resources of the compute node 102 to which the direct attached storage 104 belongs. Data nodes 106, with data node storage 108, are coupled together by a network 112, in this example called the East-West network 112 for data nodes. These interconnected data nodes 106 are called a data plane or data planes (depending upon how virtual storage is organized). The compute nodes 102 are coupled to the data nodes 106 by a network 114, in this example called the north-south network 114.

Continuing with FIG. 1, the compute nodes 102, with direct attached storage 104, implement virtual machines 116. For example, hypervisors 126 in compute nodes 102 could assign physical computing resources, including processing resources and local memory, to virtual machines 116. One or more applications can execute on the virtual machines 116. For example, one virtual machine 116 could be serving a web application, while another virtual machine 116 could be serving database applications and one or more virtual machines 116 could be running a business application, etc.

One of the virtual machines 116 is a special type called a storage virtualizer 118. The storage virtualizer 118 has a writeback cache 120, which is implemented in the direct attached storage 104. There can be multiple storage virtualizers 118. In some embodiments, each compute node 102 implements a storage virtualizer 118 and a portion of a virtual machine 116, or one or more virtual machines 116, executing one or more applications. The storage virtualizer(s) 118, with writeback cache(s) 120, and the networked data nodes 106, with data node storage 108, implement virtualized storage 124, e.g., in the form of virtual disks 128, for the virtual machines 116.

In one embodiment, the virtual machines 116 write application data through the storage virtualizer 118 to the writeback cache 120. The storage virtualizer 118 manages the writeback cache 120, and transfers incremental updates of the application data to the data nodes 106 as snapshots. Backups are performed by writing from the data nodes 106 to a backup storage 122, which is coupled to the data nodes 106 by the network 112. Further details of the computing and storage system of FIG. 1 may be found in U.S. application Ser. No. 14/284,070, entitled DATA MANAGEMENT TIER COUPLING PRIMARY STORAGE AND SECONDARY STORAGE, filed May 21, 2014, which is incorporated herein by reference for all purposes.

In operation, networked compute nodes 102, having DAS 104, implement virtual machines 116 and may transfer writes of data to the data nodes 102. These networked data nodes 102, having data node storage 108, cooperate with the storage virtualizer 118 having a writeback cache 120, which forms virtualized storage 124 in the form of virtual disks 128. The data nodes 102 may be comprised of a large number of hard disks (not shown) to implement the data node storage 108, where large blocks of data may be written. This ensures that the overall throughput associated with the write operation is very high, where a small amount of Input/Output requests (I/Os) exists. In order to generate a version of the data during the processing of an application in one embodiment, the storage virtualizer 118 may quiet (pause) an application I/O, insert an epoch marker into the writeback cache 120, and then resume the application I/O. In particular, an application, spanning one or more virtual machines 116 as an application consistency group, may use the writeback cache 120 for application I/O.

Using the log-structured format, data corresponding to each version may be dumped from the writeback cache 120 to the data node 106; wherein, the data may be written in linear fashion. The data, however, is not limited to being written in linear fashion or being logically contiguous. Further, an associated index may be maintained for each corresponding version. Accordingly, once a version is written, a new index may be generated for the next version. The index may be used to convert the logical address into a physical address. Thereby, each version is generated when an application writes the data in the compute plane within a circular buffer (not shown) on the compute node 102 and requests a snapshot of the data. Subsequently, a marker may be placed on a circular log associated with the compute node 102 and the data may be synchronized from the compute node 102 to the data node 106. This synchronization may occur periodically (i.e. every 15 or 30 minutes), where incremental changes ($\Delta$s) are recorded in each block of the version of data. That is, whatever change ($\Delta$) may be returned in the cache 120, this value is stored in the associated block for each version.

In one embodiment, the synchronization occurs using the data transfer optimization for data replication. As noted above, writes from the compute node 102 to the data node 106 may be logged into the write staging area and the data may be periodically transferred to the data plane. Each virtual disk 128 (boot and data) may possess its own write staging log. In a clustered environment, the virtual disks 128 may be transferred from multiple compute nodes 102 to the data node 108 independently. For example, virtual disks 128 within the same replication set of an Operating System (OS) boot disk or another application data disk include a large amount of data that is duplicate. Accordingly, in one embodiment, prior to the storage virtualizer 118 transferring incremental updates of the application data to the data nodes 106, each compute node 102 may generate a hash key representing the content of the virtual disk 128 using a "content hash calculator" (hash function) that generates a hash key according to a hash algorithm. The content hash calculator may use any type and form of hashing scheme to determine the content. The size of the hash key is dependent upon the hash function. In some embodiments, the hash key may be generated by a random number generator or the Toeplitz hash function. In other embodiments, the hash key may be selected from a predetermine list of hash keys. In many embodiments, the hash key may be generated or selected when the storage system boots. In other embodiments, the hash key may be generated or selected once per week, once per day, once per hour, or any other interval of time. The hash function may be designed and constructed based on any one or more criteria or design goals. Additionally, the hash function may be a secure hash of any security level or one that is otherwise cryptographically secure.

During the data replication phase, each compute node 102 periodically sends an "are you ready?" message along with the hash keys associated with each virtual disk 128 within an application group. Thereby, the compute node 102 initiates data replication by determining whether the data node 106 is ready to receive the data. Until the data node 106 is ready, the compute node 102 will wait; and when the data node is ready, the data node 106 can detect which data is a duplicate copy of that which is stored in the data node storage 108. For example, the data node 106 may use the hash key to search a block map that provides address translations from system virtual addresses to physical addresses associated with memory pages of the mapped memory space or some other mapping means. When the data node 106 detects a match, it determines that the content is the same; and thereby, the data is duplicate. As a result, the compute node 102 can transfer non-duplicate data to the data node 106, while only a set of logical block addresses associated with the duplicate data is transferred. In this fashion, only the non-duplicate data is transferred to the data node 106, eliminating redundant transfer of duplicate data.

The duplicate data detection feature of the data node 106 may use the hash key to determine whether the content is the same between the storage units (104, 108) coupled to both compute node 106 and the data node 106. As noted above, the data node 106 can store the hash key in the block map, which maps the logical block addresses to the physical memory location corresponding to each virtual disk. Further, the data node 106 can identify which data is duplicated based upon the hash key and the use of the deduplication index, wherein the index may include a mapping of each application group to its respective virtual disks. Further, the deduplication index may include the logical block address and hash key associated with each virtual disk. To keep track of duplicate data, the data node 106 may also generate a placeholder map indicating which data is duplicated and non-duplicated. In one implementation, the placeholder map may include the logical block address, hash key, and a duplication identifier. After identifying whether data corresponding to a virtual disk is present, the data node 106 may flag the duplication identifier when it determines that the data is duplicate. Alternatively, the data node 106 may leave the duplication identifier unflagged, when it determines that the data is not duplicate. The data node 106 may also send the placeholder map to the compute node 102 and, thereby, enable the compute node 102 to detect which data is duplicate and non-duplication. Accordingly, the compute node 102, in response, can transfer non-duplicate data to the data node 106, while only sending a set of logical block addresses associated with the duplicate data, which eliminates redundant data transfer.

Address translation is not limited to the use of an index. In one embodiment, address translation may comprise the use of a table of page table entries that provides address translations from system virtual addresses to physical addresses for memory pages of the mapped memory space or some other mapping means. Data transfer optimization may be initiated by any processor or controller in adherence to a policy. Further, the processor or controller may be located anywhere within the virtualized storage system or externally coupled thereto. The processor or controller may exist within the compute node 102 or data node 106. Although the embodiment shown in FIG. 1 includes a data transfer optimization protocol implemented in one version of a secondary storage system, the method for data transfer optimization may be implemented on any versioned secondary storage system; hence, the method proposed herein should not be construed as limited to only the embodiments set forth.

In one embodiment, recovery of data may also take advantage of a data transfer optimization protocol. For example, the compute node 102 may send a request for data recovery of an application group to the data node 106. In some embodiments, data recovery may comprise two phases: a first attempt phase and a subsequent recovery phase. Since an application group may include a set of virtual disks, the data node, during the first attempt phase, may seek to generate a baseline for future data recovery using the largest virtual disk of the application group. For example, the data node 106 or a management network assembly (to be described in detail with respect to FIG. 2) may detect whether the data recovery request is a first attempt to recover data associated with the application group. When it is a first attempt for data recovery, the data node 106 may identify the largest virtual disk associated with the application group. The data node 106 may send the data associated with the largest virtual disk, along with the deduplication index to the requesting compute node 102. The compute node 102 may store the data and the deduplication index in an extent map. At this point, the data node 106 may send just the deduplication index along with the compute node identifier associated with the requesting compute node to a second compute node. This compute node identifier indicates which compute node that possesses the data corresponding to the largest virtual disk in the application group. Additionally, this point in the protocol may also serve as the starting point of the subsequent recovery phase of data recovery as noted above. The second compute node, in response, may send all of the logical block addresses associated with all blocks of data for the application group to the requesting compute node indicated by the compute node identifier. The requesting compute node may check the extent map for duplicated data, and in response, send notice of the duplicate and non-duplicate data to the second compute node. Accordingly, the second compute node may locate the duplicate data amongst peer compute nodes of the compute plan or a virtual machine 116 within the same compute node. As such, the second compute node is enabled to retrieve duplicate data from the peer compute node or the virtual machine, while retrieving non-duplicate data from the data node 106. Thereby, bandwidth is optimized within the north-south network 114.

Figure 2:
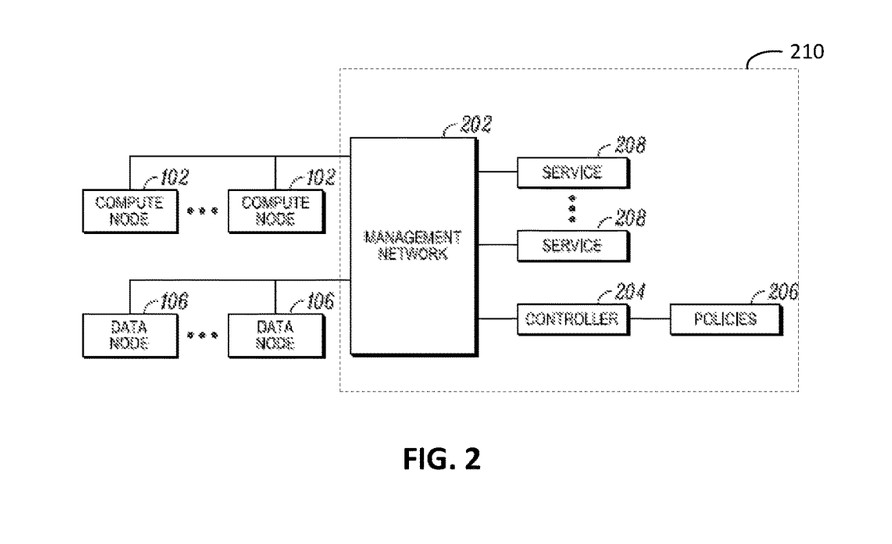
FIG. 2 is a block diagram showing a management network assembly coupled to compute nodes and data nodes of FIG. 1, having a controller in or coupled to a management network, which implements policies relating to the performance of data transfer optimization.

FIG. 2 is a block diagram showing a management network assembly 210 coupled to compute nodes 102 and data nodes 106 of the computing and storage system of FIG. 1. The management network assembly 210 may include a controller 204 in or coupled to the management network 202, which may implements policies 206 relating to the performance of data transfer optimization. These policies 206 may comprise a group of rules for determining how the data transfer optimization should be performed. The management network 202 spans the compute and data planes, and defines a management or control plane. The north-south network 114 couples the compute nodes 102 and the data nodes 106 for purposes of data transfer, while the management network 202 couples the compute nodes 102 and the data nodes 106 for purposes of managing these. Particularly, the controller 204 may communicate with the storage virtualizer(s) 118, which are implemented in the compute nodes 102, and with the data nodes 106 for specific tasks relating to the data replication and data recover operations, which the controller 204 may direct through the management network 202. One or more services 208 may also be coupled to the management network 202. In various embodiments, these services 208 may coordinate the entire cluster, and may be open stack permitted. One or more services 208 could manage the hypervisors 126, manage storage and latencies, or direct where data should be replicated during data replication or data recovery, e.g., direct compute nodes 102 to data nodes 106. The implementation of the data transfer optimization is not limited to the use of the controller 204 and the polices 206, however. The management network 202 may include software to control the efficient data transfer protocol. In the alternative, the data transfer protocol may be implemented using a processor in or coupled to each compute node 102. Further, the data transfer protocol may be implemented using a processor in or coupled to each the data node 106.

Figure 3:
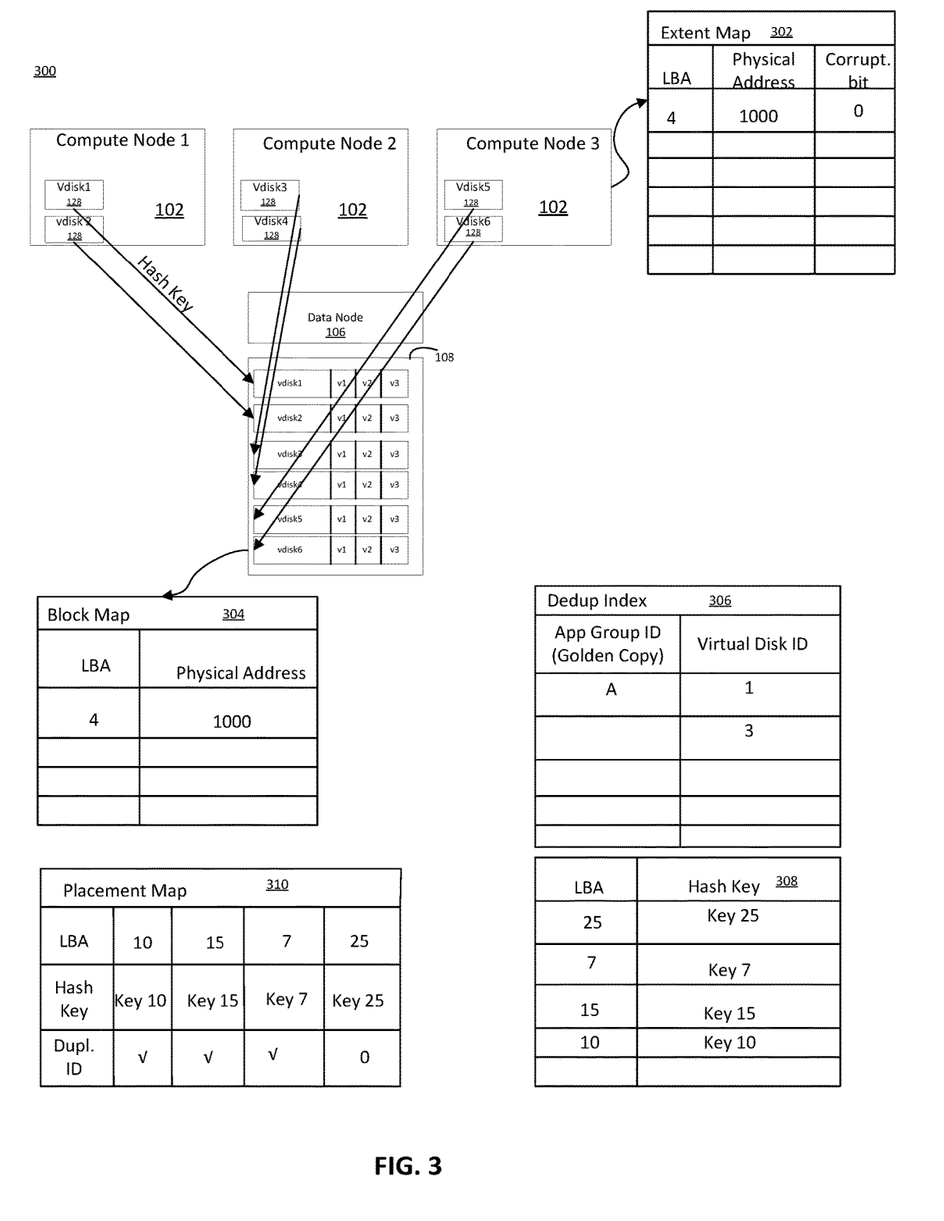
FIG. 3 is a block diagram of data flow during a data replication process in one embodiment.

FIG. 3 is a block diagram of one example illustrating data flow within the storage system during a data replication process in one embodiment. During data replication, each set of virtual disks 128 associated with the compute nodes 102 are copied in the data node storage 108. As shown, the compute nodes 102 implement virtualized storage in the form of virtual disks 128. Each virtual disk is associated with a replication set of an application group. The application group may be a set of manually configured virtual disks that belong to same replication set of application. In the alternative, the application group may be an automatically configured group of virtual disks belonging to same replication set of an application. An application manager (not shown) may automatically create a replication set of the application group. Although only one data node 106 is shown, the system may be comprised of a plurality of data nodes 106. Each data node 106 may maintain the block map 304 (previously described) comprising a translation for the logical block addresses for each virtual disk 128 into the physical address of where the data is stored in memory.

In some embodiments, a deduplication index 306 may include a first key that identifies whether the data is associated with a golden image or an application group including virtual disk identification; and a second key that is associated with the logical block address (LBA) and includes a value corresponding to the hash key, block map index, and the compute node identifier. For example, a first table of the deduplication index 306 may contain a table designating whether a golden image is associated with the data stored in the virtual disks 128 or whether an application group is stored thereon. A golden image is a template for a virtual machine 116, virtual desktop, server or hard disk drive. A golden image may also be referred to as a clone image, master image or base image. When generating a golden image, an administrator may set up the computing environment and save the disk image as a pattern for making more copies. Alternatively, the deduplication index 306 may indicate that a particular set of virtual disks 128 comprises data relating to an application group. Further the deduplication index may include another table 308 having the logical block address and hash key associated with each virtual disk. During data replication and data recovery these may be accessed to determine whether the data is duplicate or not.

In some embodiments, a placeholder map 310 may be generated by the data node 106 in an effort to track duplicate data. The placeholder map 310 associates the logical block addresses of each virtual disk with a duplication identifier that indicates whether the data is duplicate or not. In particular, the placeholder map 310 may include the logical block address, the hash key, and the duplication identifier. For example, the logical block address shown in the first column of the map 310 may be 10 and the hash key may be "key 10." During data replication, the data node 106 generates the placeholder map and transfers this map to the compute node 102. The data node may flag the duplication identifier when it determines that the data is duplicate based upon comparing the hash keys of the data stored within the compute plane and the data plane. Alternatively, the data node may leave the duplication identifier unflagged, when it determines that the data is not duplicate. As such, the duplication identifier is either flagged or remains unflagged. As shown in the placement map example, three of the blocks of data are duplicated on the data node, therefore the duplication identifier is flagged. Yet, one of the blocks of data is not duplication, therefor it remains unflagged ("0").

In some embodiments, the compute node 102 maintains an extent map 302, which maps the logical block address of the data to a physical address within memory and includes a modification bit that identifies whether the data has been modified. For example, the extent map may include an "isDirty" bit (a "dirty flag" or "modified flag"), which notifies peer compute nodes whether the data is a reliable source or not. For example, when a compute node detects that the data has been modified or corrupted, the modification bit will be set.

Figure 4:
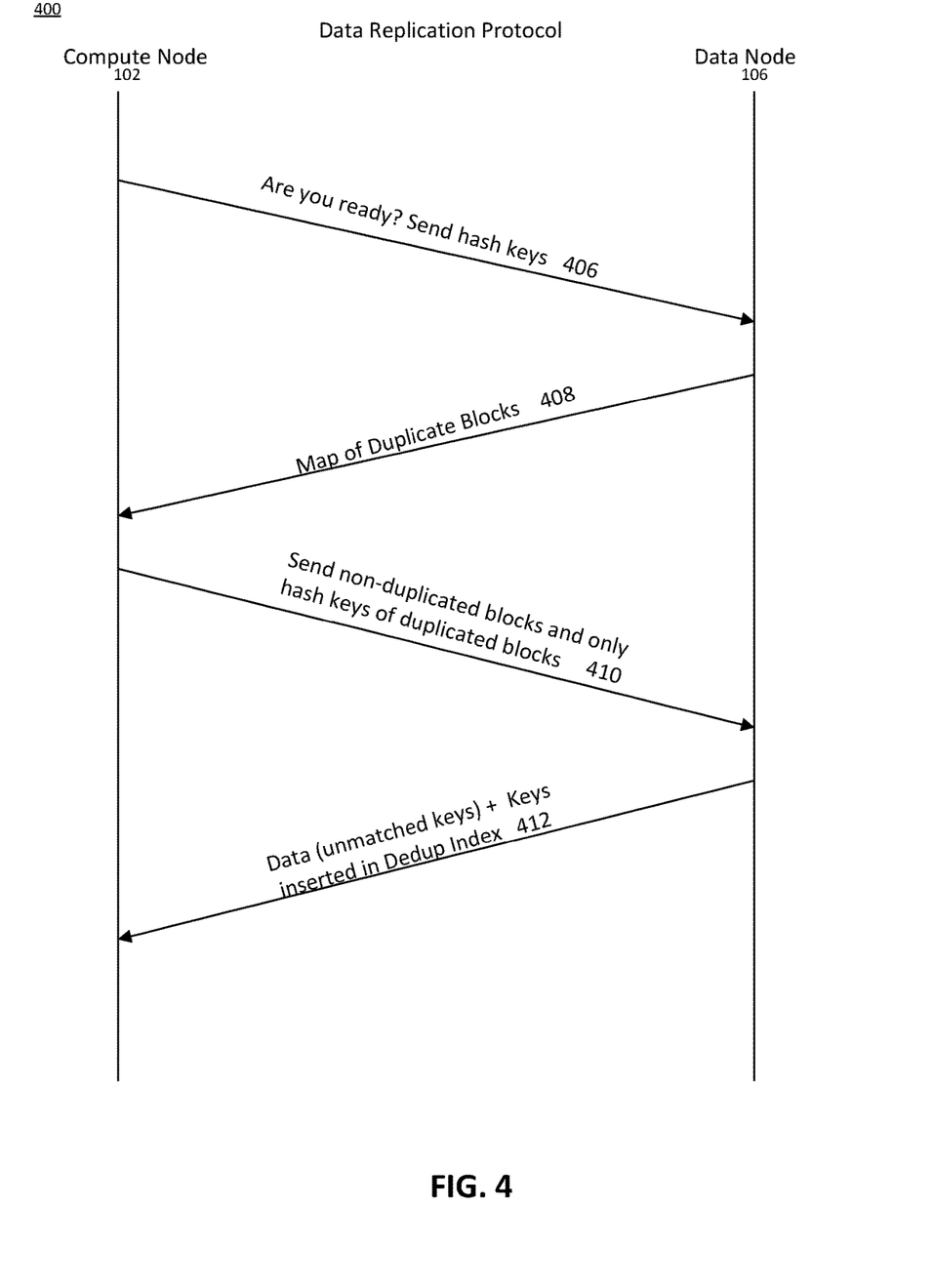
FIG. 4 is a data replication (forward flow) protocol diagram in accordance with an exemplary embodiment.

FIG. 4 is a data replication (forward flow) protocol 400 diagram in accordance with an exemplary embodiment. In particular, this data flow shows some of the details for the transfer of data from the compute/primary plane to the secondary/data plane. For example, the data replication protocol may include an initial request from the compute node 102 to the data node 106 in an effort to detect whether the data node is ready to receive data. As noted above, data writes are logged into a write staging area, where the data is periodically transferred to the data node 106 from compute node 102. Each virtual disk 128 (boot and data) possesses its own write staging log. Further, a hash key may be calculated at each compute node for each virtual disks, where the hash key relates to the content of the data at the block level. Data replication may be an asynchronous operation that is not synchronized with the application I/O flow or replication flow. Periodically, the data replication process 400 wakes up and requests whether the secondary node is ready to receive data at action 406. In one embodiment, the compute node may send a message (i.e. "Are you ready" message), along with the hash keys of each block of the data that is to be replicated to the data node. The data node 106 may maintain a versioned storage for each virtual disk with the index of logical block address to physical address for each block.

This index as noted above is called the "block map." The data node 106 also keeps another index (i.e. deduplication index, as known as the "dedup index") including "hash key" as a key and an index to the block map. Once the data node receives the "Are you ready" message, it searches the "dedup index" to detect duplicate blocks. In response, the data node 106 generates the placeholder map for all the keys and sends this map to the compute node 102 in action 408. Upon receiving the reply, the compute node 102 retrieves the associated duplicate and non-duplicate blocks. Optimizing the data transfer, the compute node sends only non-duplicate data to the data node 106, while transferring the logical block addresses and hash keys for each duplicate block in action 410. For the non-duplicate data (new data), the data node 106 updates the block map and then inserts the corresponding hash keys into the "dedup index." For the duplicate data, only the block map index is updated to reflect the physical location of the logical block addresses. In response, the data node sends the data blocks corresponding to unmatched keys, along with the corresponding "hash keys," which may be used during any next attach in action 412.

Figure 5:
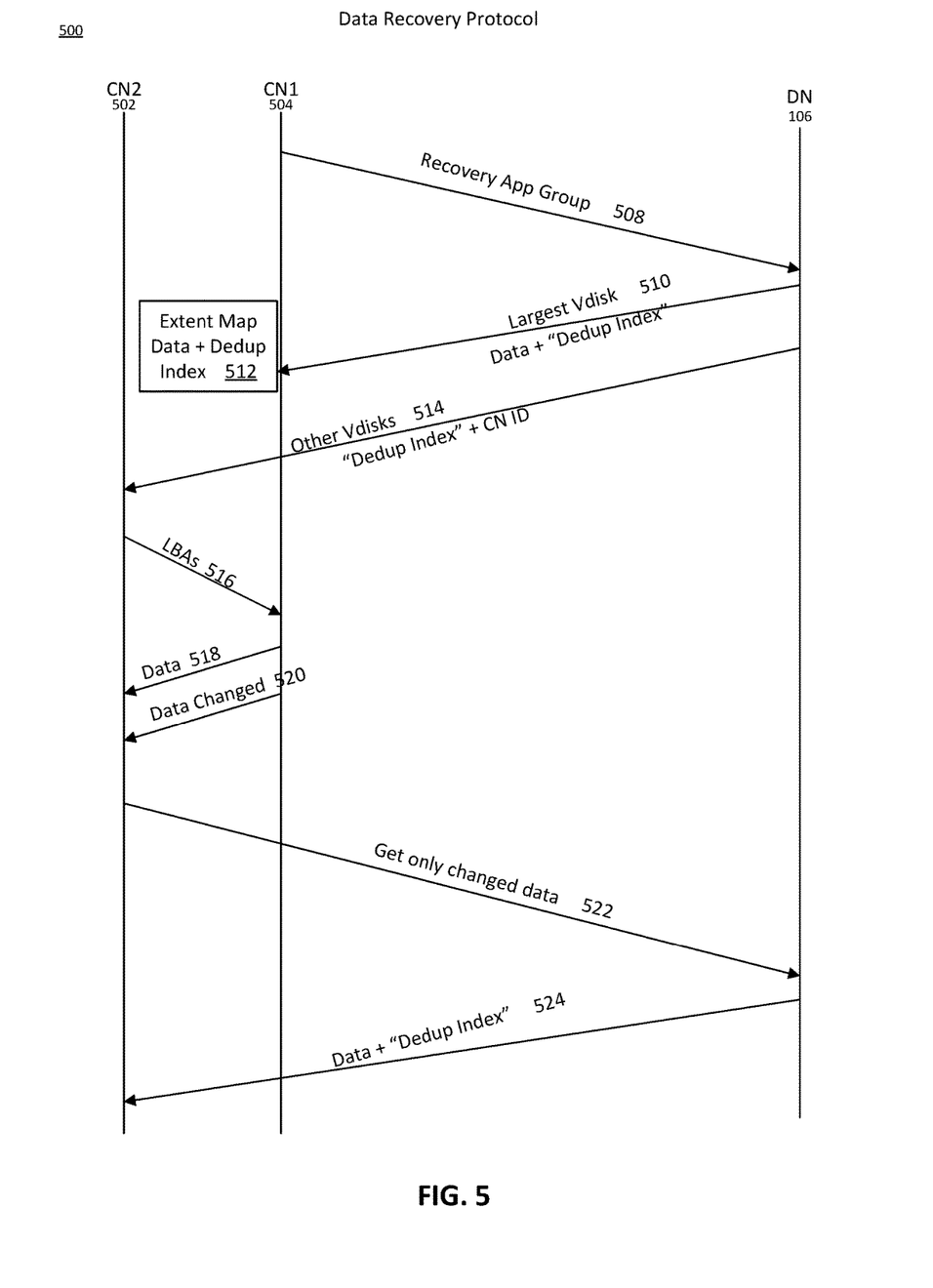
FIG. 5 is a data recovery (reverse flow) protocol diagram in accordance with an exemplary embodiment.

FIG. 5 is a data recovery (reverse flow) protocol diagram in accordance with an exemplary embodiment. In particular, this data flow shows some of the details for the transfer of data from the secondary/data plane to the compute/primary plane. Initially in action 508, a requesting compute node 504 (CN1) sends a request to the data node 106. In response, the data node 106 may detect whether the request is a first request for the data. If the data recovery is a first attempt, the data node 106 may detect which virtual disk is the largest within the application group. Accordingly, in action 510, the data node may send the data corresponding to the largest virtual disk, along with the deduplication index to the compute node 504. Consequently, the compute node 504 may maintain both the data and the deduplication index in the extent map 512. For the remaining virtual disks associated with the application group, the data node 106 may send the deduplication index along with an identifier associated with a second compute node CN2 in an action 514. In response, the compute node CN2 may send the logical bus addresses and the hash keys of the data to the requesting compute node CN1 in an action 516. The requesting compute node CN1 may detect which blocks of data are duplicate copies and sends the deduplication index associated with the duplicate copies of data to the second compute node CN2. Thereby the requesting compute node CN1 keeps track of the blocks that got changed after the recovery using the extent map and sends these to the second compute node CN2 in actions 518 and 520. Thereby, for the duplicated data, the compute node 502 is enabled to seek and retrieve the duplicate data from any peer compute node. If the data has changed, the compute node CN2 retrieves the data from data node in action 522 and 524: sending a request for the changed data to the data node in message 522 and receiving the data along with the deduplication index in action 524. In the alternative, for the blocks of data that are non-duplicate copies, the data node 106 may also send the data associated with these blocks, along with the deduplication index in action 520. When the data is duplicate, the data may be locally copied within the compute plane. The process may be the same across compute nodes as well as within the same compute node. The data recoveries for subsequent data recovery attempts may be similar to the data recovery protocol associated with actions 514-524.

In another embodiment, the method may include a process for booting any virtual machine or attaching any virtual disk, where an initial request is sent to data node from compute node. Since the data node already knows whether the given compute node previously booted/attached a particular virtual disk, when it detects a previous boot/attach, the data node can send the globally unique identifier (GUID) corresponding to the previously attached or booted application group. In response, the compute node may perform localized data recovery using the source GUID.

In another embodiment, during first recovery/boot of a virtual disk, the data node may send the hash key along with the actual data. Once received, the compute node maintains this information within the associated extent map. During recovery/boot in a subsequent attempt, the data node may first send the hash keys of all the data blocks associated with the recovery. The compute node, in response, may compare these hash keys with those found in its extent map, searching for a match. Accordingly, the compute node may send the data associated with all the matched hash keys to the data node.

Figure 6A:
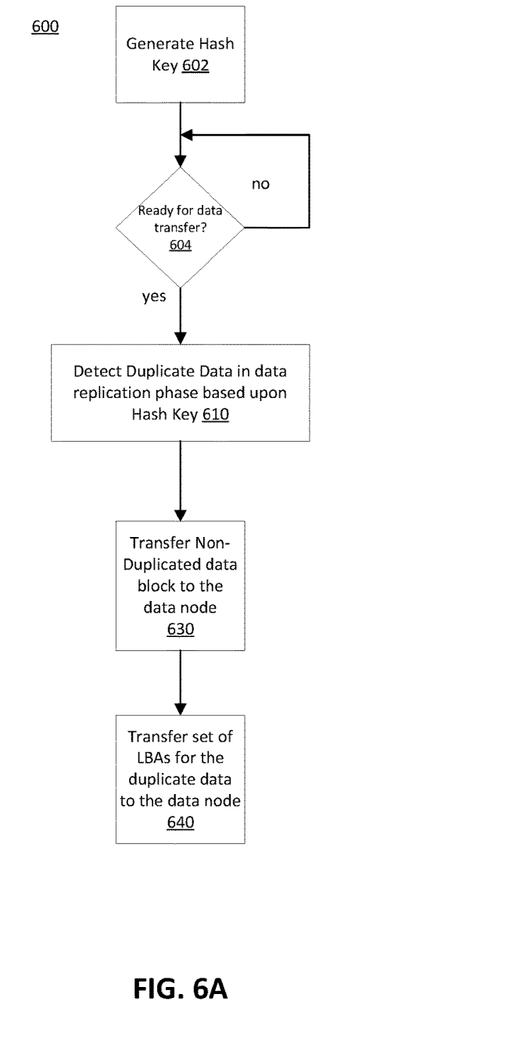
FIG. 6A is a flow chart for data replication protocol in accordance with an example embodiment.

FIG. 6A is a flow chart for data replication protocol 600 in accordance with an example embodiment. In an action 602, the management network assembly 210 or compute node 102 may generate a hash key. In a decision action 604, the assembly 210 or the data node 106 may determine whether the data node is ready to receive replicated data from the compute plane. Until the data node is ready, the data replication process will wait as indicated by the loopback process. When the data node is ready, in an action 610, the management network assembly 210 or data node 106 can detect which data is a duplicate copy of that which is stored at the data node. For example, the management network assembly 210 may use the hash key to search the block map at the data node for a match, which indicates that the content is the same and thereby the data is duplicate. In an action 630, the compute node can transfer the non-duplicate data to the data node. In another action 640, the management network assembly 210 can transfer a set of logical block addresses associated with the duplicate data to the data node.

Figure 6B:
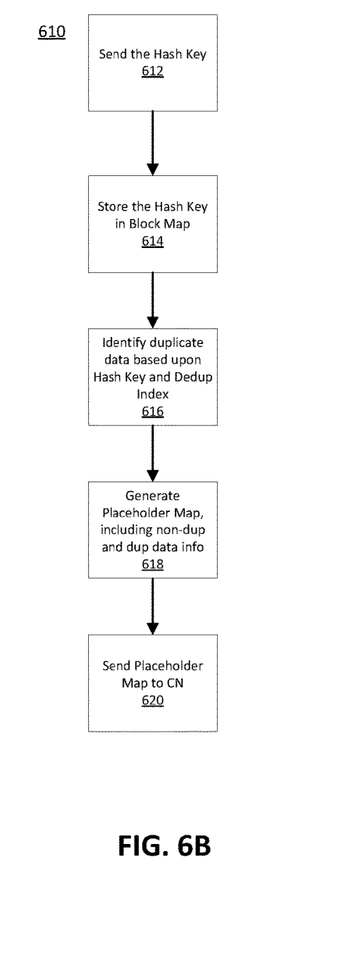
FIG. 6B is a flow chart for the duplicate data detection feature of the data replication protocol shown in FIG. 6A.

FIG. 6B is a flow chart for the duplicate data detection feature 610 of the data replication protocol shown in FIG. 6A. In an action 612, the compute node can send the hash key to the data node. In an action 614, the data node can store the hash key in the block map, which maps the logical block addresses to the physical memory location corresponding to each virtual disk. In an action 616, the data node can identify which data is duplicated based upon the hash key and the use of the deduplication index, wherein the index may include a mapping of each application group to its respective virtual disks. Further, the index may include the logical block address and hash key associated with each virtual disk. The data node may generate a placeholder map indicating which data is duplicated and non-duplicated in an action 618. For example, the placeholder map may include the logical block address, hash key, and a duplication identifier. The data node may, after identifying whether data corresponding to a virtual disk is present, flag the duplication identifier when it determines that the data is duplicate. Accordingly, the data node may leave the duplication identifier unflagged, when it determines that the data is not duplicate. In a final action 620, the data node may send the placeholder map to the compute node.

Figure 7:
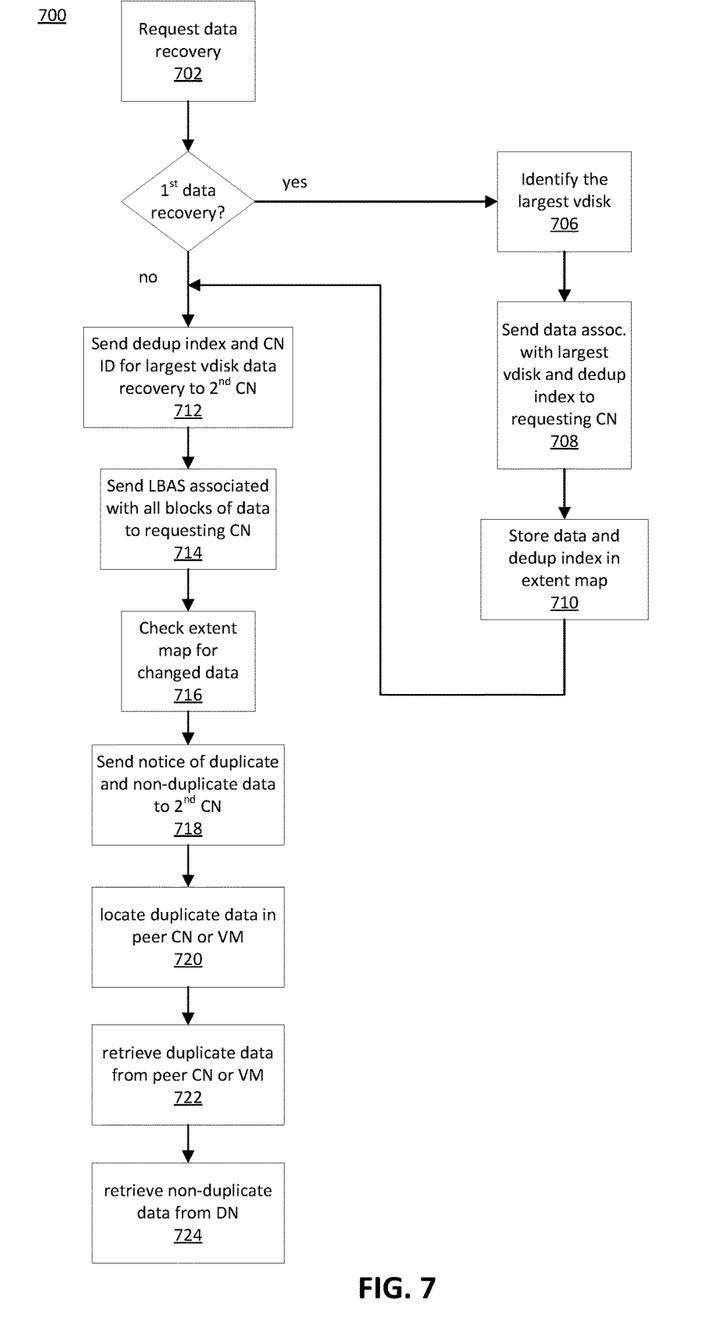
FIG. 7 is a flow chart for data recovery protocol in accordance with an example embodiment.

FIG. 7 is a flow chart for data recovery protocol 700 in accordance with an example embodiment. In a first action 702, the compute node may make a request data recovery from the data node. The management network assembly 210 or the data node, in a decision action 704, may detect whether the data recovery request is a first attempt at data recovery. When it is a first attempt for data recovery, the data node may identify the largest virtual disk associated with the application group that will be recovered in an action 706. In an action 708, the data node may send the data associated with the largest virtual disk, along with the deduplication index to the requesting compute node. In response, the compute node may store the data and the deduplication index in an extent map in an action 710. The method will pick up where the process forks when it is determined that the request for data recovery is not a first attempt as detected in decision action 704. In an action 712, the data node may send to a second compute node just the deduplication index along with the compute node identifier for the requesting compute node, which possesses the data corresponding to the largest virtual disk in the application group. In response, the second compute node may send all of the logical block addresses associated with all blocks of data for the application group to the requesting compute node in an action 714. In an action 716, the requesting compute node may check the extent map for changed data, wherein the changed data is signified, for example by a "dirty flag" or "modified flag." The requesting compute node may also send notice of the duplicate and non-duplicate data to the second compute node an action 718. In response, the second compute node may locate the duplicate data amongst peer compute nodes or a virtual machine within the same compute node in an action 720. In an action 722, the second compute node may retrieve the duplicate data from the peer compute node or the virtual machine with in the same compute node. In a final action 724, the second compute node may retrieve the non-duplicate data from the data node.

Figure 8:
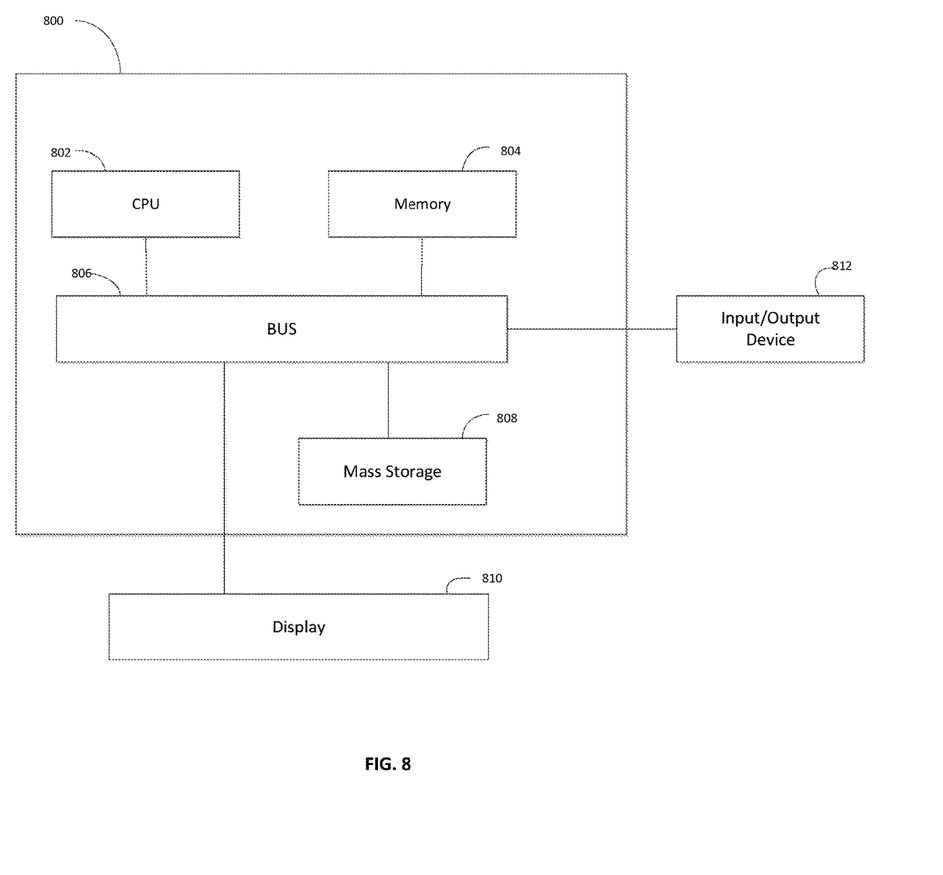
FIG. 8 is an illustration showing an exemplary computing device which may be implemented in the embodiments described herein.

It should be appreciated that the methods described herein may be performed with a digital processing system, such as a conventional, general-purpose computer system. Special purpose computers, which are designed or programmed to perform only one function may be used in the alternative. FIG. 8 is an illustration showing an exemplary computing device which may implement the embodiments described herein. The computing device of FIG. 8 may be used to perform embodiments of the functionality for performing the data transfer optimization with an cloud environment in accordance with some embodiments. The computing device includes a central processing unit (CPU) 802, which is coupled through a bus 806 to a memory 804, and mass storage device 808. Mass storage device 808 represents a persistent data storage device such as a floppy disc drive or a fixed disc drive, which may be local or remote in some embodiments. The mass storage device 808 could implement a backup storage, in some embodiments. Memory 804 may include read only memory, random access memory, etc. Applications resident on the computing device may be stored on or accessed through a computer readable medium such as memory 804 or mass storage device 808 in some embodiments. Applications may also be in the form of modulated electronic signals modulated accessed through a network modem or other network interface of the computing device. It should be appreciated that CPU 802 may be embodied in a general-purpose processor, a special purpose processor, or a specially programmed logic device in some embodiments.

Display 812 is in communication with CPU 802, memory 804, and mass storage device 808, through bus 806. Display 812 is configured to display any visualization tools or reports associated with the system described herein. Input/ output device 810 is coupled to bus 806 in order to communicate information in command selections to CPU 802. It should be appreciated that data to and from external devices may be communicated through the input/output device 810. CPU 802 can be defined to execute the functionality described herein to enable the functionality described with reference to FIGS. 1-4. The code embodying this functionality may be stored within memory 804 or mass storage device 808 for execution by a processor such as CPU 802 in some embodiments. The operating system on the computing device may be iOS™, MS-WINDOWS™, OS/2™, UNIX™, LINUX™, or other known operating systems. It should be appreciated that the embodiments described herein may be integrated with virtualized computing system also.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, flash memory devices, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to so connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware; for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of minimizing duplicate data transfer in a clustered storage system comprising:
   generating a hash key relating to content of a virtual disk associated with a compute node;
   verifying, during a data replication (forward flow) phase, whether a data node is ready to receive data from a replicating compute node having a primary storage coupled thereto;
   detecting, in response to the readiness of the data node, duplicate data stored in the primary storage and a secondary storage coupled to a data node within an application group; and
   transferring, in response to the detected duplicate data, the detected non-duplicate data and a set of logical block addresses associated with the detected duplicate data from the replicating compute node to the data node.

2. The method of claim 1, further comprising:
sending, during a data recovery (reverse flow) phase, a request to recover data associated with an application group from a requesting compute node to the data node, wherein the application group represents a set of virtual disks;
detecting duplicate data stored in a compute plane, wherein the compute plane includes a plurality of compute nodes and the request compute node; and
transferring, in response to the detected duplicate data, the detected duplicate data from a peer compute node or a virtual machine within the requesting compute node; and
transferring the detected non-duplicate data from the data node to the requesting compute node.

3. The method of claim 1, wherein the detecting duplicate data during the data replication phase comprising:
inspecting the deduplication index for duplicate hash keys;
flagging, in response to the duplicate hash keys, a duplicate identifier associated with the virtual disk;
generating a placeholder map including the logical block address, the hash key, and the duplicate identifier, wherein the flagged duplicate identifier indicates the detected duplicate data and an unflagged duplicate identifier indicates the detected non-duplicate data; and
sending the placeholder map to the compute node.

4. The method of claim 1, wherein the transfer during the data replication phase comprising:
updating a block map at the data node with a physical memory address within the primary storage associated with the detected non-duplicate data, wherein the block map includes a logical block address mapped to the physical memory address for each virtual disk;
updating a deduplication index at the data node with the hash key and a logical block address associated with the detected non-duplicate data, wherein the deduplication index associates each hash key with a respective logical block address for each virtual disk, and wherein the deduplication index associates a replicated application group with a set of virtual disks or a golden image; and
writing the detected non-duplicate data in a secondary storage coupled to the data node.

5. The method of claim 1, wherein the transfer during a data replication phase comprising:
updating a block map with the set of physical memory locations corresponding to the set of logical block addresses associated with the detected duplicate data;
updating a deduplication index with a set of hash keys associated with the detected duplicate data; and
transferring the deduplication index from the data node to the compute node.

6. The method of claim 2, wherein the detecting duplicate data during the data recovery phase comprising:
detecting whether the request to recover data is a first data recovery attempt;
generating, in response to a first data recovery attempt, data corresponding to a largest virtual disk associated with the application group for an extent map at the requesting compute node, wherein the extent map having the logical block address mapped to the physical memory address for each virtual disk and a modification identifier that indicates whether the data is modified;
sending the deduplication index and an identifier of the requesting compute node to a second compute node for a remaining subset of virtual disks associated with the application group; and
detecting duplicate data and non-duplicate data within a plurality of compute nodes based upon the deduplication index and the extent map.

7. The method of claim 6, wherein the generating data for the extent map for the first data recovery attempt comprising:
detecting a largest virtual disk from the set of virtual disks associated with the application group;
sending data associated with the largest virtual disk and the deduplication index to the requesting compute node; and
storing the data associated with the largest virtual disk and the deduplication index in the extent map.

8. The method of claim 6, wherein the detecting the duplicate data comprising:
sending a plurality of logical block addresses associated the remaining set of virtual disks from the second compute node to the requesting compute node;
comparing the plurality of logical block address with each logical block address found in the extent map;
selecting duplicate data based upon logical block address of data not found to be modified in the extent map; and
sending each logical block address associated with duplicate data to the second compute node as the duplicate data; and
sending each logical block address associated with modified data as the non-duplicate data.

9. The method of claim 2, wherein the transferring detected non-duplicate data from the data node comprising:
sending logical block addresses associated with the non-duplicate data to the data node;
identifying each physical address mapped to each logical block address for the non-duplicate data in the block map;
retrieving the non-duplicate data from a secondary storage coupled to the data node;
transferring the deduplication index to one of the plurality of compute nodes; and
writing the non-duplicate data in a storage.

10. The method of claim 1, further comprising:
sending, in a data recovery process, a request to recover data associated with a set of virtual disks from a requesting compute node to the data node;
detecting whether the set of virtual disks are associated with a previously booted or attached application group;
sending, in response to a detected previously booted or attached application group, a globally unique identifier (GUID) corresponding to the previously attached or booted application group; and
performing localized recovery from peer compute nodes based upon the GUID.

11. An optimization utility for a clustered storage system comprising:
a memory; and
a processor coupled to the memory, the processor operable to:
generate a hash key relating to content of a virtual disk associated with a compute node;
verify, during a data replication (forward flow) phase, whether a data node is ready to receive data from a replicating compute node having a primary storage coupled thereto;

detect, in response to the readiness of the data node, duplicate data stored in the primary storage and a secondary storage coupled to a data node; and transfer, in response to the detected duplicate data, the detected non-duplicate data and a set of logical block addresses associated with the detected duplicate data from the replicating compute node to the data node.

12. The optimization utility for a clustered storage system of claim 11, the processor further operable to:

send, during a data recovery (reverse flow) phase, a request to recover data associated with an application group from a requesting compute node to the data node, wherein the application group represents a set of virtual disks;

detect duplicate data stored in a compute plane, wherein the compute plane includes a plurality of compute nodes and the request compute node; and transfer, in response to the detected duplicate data, the detected duplicate data from a peer compute node or a virtual machine within the requesting compute node; and transfer the detected non-duplicate data from the data node to the requesting compute node.

13. The optimization utility for a clustered storage system of claim 11, wherein the processor, for detecting duplicate data during the data replication phase, operable to:

inspect the deduplication index for duplicate hash keys;

flag, in response to the duplicate hash keys, a duplicate identifier associated with the virtual disk;

generate a placeholder map including the logical block address, the hash key, and the duplicate identifier, wherein the flagged duplicate identifier indicates the detected duplicate data and an unflagged duplicate identifier indicates the detected non-duplicate data; and send the placeholder map to the compute node.

14. The optimization utility for a clustered storage system of claim 11, wherein the processor, for transferring data during the data replication phase, operable to:

update a block map at the data node with a physical memory address within the primary storage associated with the detected non-duplicate data, wherein the block map includes a logical block address mapped to the physical memory address for each virtual disk;

update a deduplication index at the data node with the hash key and a logical block address associated with the detected non-duplicate data, wherein the deduplication index associates each hash key with a respective logical block address for each virtual disk, and wherein the deduplication index associates a replicated application group with a set of virtual disks or a golden image; and write the detected non-duplicate data in a secondary storage coupled to the data node.

15. The optimization utility for a clustered storage system of claim 12, wherein the processor, for detecting duplicate data during the data recovery phase, operable to:

detect whether the request to recover data is a first data recovery attempt;

generate, in response to a first data recovery attempt, data corresponding to a largest virtual disk associated with the application group for an extent map at the requesting compute node, wherein the extent map having the logical block address mapped to the physical memory address for each virtual disk and a modification identifier that indicates whether the data is modified;

send the deduplication index and an identifier of the requesting compute node to a second compute node for a remaining subset of virtual disks associated with the application group; and detect duplicate data and non-duplicate data within a plurality of compute nodes based upon the deduplication index and the extent map.

16. A non-transitory computer-readable medium including code for performing a method of minimized duplicate data transfer in a clustered storage system, the method comprising:

generating a hash key relating to content of a virtual disk associated with a compute node;

verifying, during a data replication (forward flow) phase, whether a data node is ready to receive data from a replicating compute node having a primary storage coupled thereto;

detecting, in response to the readiness of the data node, duplicate data stored in the primary storage and a secondary storage coupled to a data node; and transferring, in response to the detected duplicate data, the detected non-duplicate data and a set of logical block addresses associated with the detected duplicate data from the replicating compute node to the data node.

17. The computer-readable medium of claim 16, further comprising:

sending, during a data recovery (reverse flow) phase, a request to recover data associated with an application group from a requesting compute node to the data node, wherein the application group represents a set of virtual disks;

detecting duplicate data stored in a compute plane, wherein the compute plane includes a plurality of compute nodes and the request compute node; and transferring, in response to the detected duplicate data, the detected duplicate data from a peer compute node or a virtual machine within the requesting compute node; and transferring the detected non-duplicate data from the data node to the requesting compute node.

18. The computer-readable medium of claim 16, wherein the detecting duplicate data during the data replication phase comprising:

inspecting the deduplication index for duplicate hash keys;

flagging, in response to the duplicate hash keys, a duplicate identifier associated with the virtual disk;

generating a placeholder map including the logical block address, the hash key, and the duplicate identifier, wherein the flagged duplicate identifier indicates the detected duplicate data and an unflagged duplicate identifier indicates the detected non-duplicate data; and sending the placeholder map to the compute node.

19. The computer-readable medium of claim 16, wherein the transfer during the data replication phase comprising:

updating a block map at the data node with a physical memory address within the primary storage associated with the detected non-duplicate data, wherein the block map includes a logical block address mapped to the physical memory address for each virtual disk;

updating a deduplication index at the data node with the hash key and a logical block address associated with the detected non-duplicate data, wherein the deduplication index associates each hash key with a respective logical block address for each virtual disk, and wherein the deduplication index associates a replicated application group with a set of virtual disks or a golden image; and writing the detected non-duplicate data in a secondary storage coupled to the data node.

20. The computer-readable medium of claim 17, wherein the detecting duplicate data during the data recovery phase comprising:

detecting whether the request to recover data is a first data recovery attempt;

generating, in response to a first data recovery attempt, data corresponding to a largest virtual disk associated with the application group for an extent map at the requesting compute node, wherein the extent map having the logical block address mapped to the physical memory address for each virtual disk and a modification identifier that indicates whether the data is modified;

sending the deduplication index and an identifier of the requesting compute node to a second compute node for a remaining subset of virtual disks associated with the application group; and detecting duplicate data and non-duplicate data within a plurality of compute nodes based upon the deduplication index and the extent map.

* * * * *